United States Patent
Inoue et al.

(10) Patent No.: US 6,216,256 B1
(45) Date of Patent: Apr. 10, 2001

(54) SEMICONDUCTOR INTEGRATED CIRCUIT AND METHOD OF DESIGNING THE SAME

(75) Inventors: Koji Inoue, Tokyo; Izuru Nagahara; Hirokazu Sawada, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/081,621

(22) Filed: May 20, 1998

(30) Foreign Application Priority Data

May 22, 1997  (JP) .................................................. 9-132145

(51) Int. Cl.[7] .................................................... G06F 17/50
(52) U.S. Cl. ................................... 716/6; 716/4; 716/10; 716/19; 326/101
(58) Field of Search .................................. 716/6; 324/763; 326/46; 327/277; 368/117; 365/233

(56) References Cited

U.S. PATENT DOCUMENTS

| | | | |
|---|---|---|---|
| 5,886,901 | * 3/1999 | Magoshi | 716/6 |
| 5,898,640 | * 4/1999 | Ben-Meir et al. | 365/233 |
| 5,923,621 | * 7/1999 | Kanekal et al. | 368/117 |
| 6,008,680 | * 12/1999 | Kyles et al. | 327/277 |
| 6,037,801 | * 3/2000 | Zhu | 326/46 |
| 6,046,600 | * 4/2000 | Whetsel | 324/763 |

\* cited by examiner

*Primary Examiner*—Matthew Smith
*Assistant Examiner*—Jibreel Speight
(74) *Attorney, Agent, or Firm*—Ronald P. Kananen; Rader, Fishman & Grauer

(57) ABSTRACT

The layout of a semiconductor IC is determined making use of a first logical cell of an ordinary flip-flop based on a logical net. Logical simulation is performed according to the result of the layout, that is, the layout information. The possibility of erroneous operation caused by timing deviations is verified by comparing the timing information from the result of the logical simulation with the design specifications. Furthermore, the logical cells at points where there is the possibility of erroneous operation caused by timing deviations are replaced by second or third logical cells having delay elements connected to data input or output terminals of the flip-flops. The final layout of the semiconductor IC is then decided.

1 Claim, 10 Drawing Sheets

FIG. 8D F22-Q

SEMICONDUCTOR INTEGRATED CIRCUIT AND METHOD OF DESIGNING THE SAME

BACKGROUND OF THE INVENTION

1. Field of the Invention

The present invention relates to a semiconductor integrated circuit (IC) and a method of designing the same, more particularly relates to a semiconductor IC and its design method capable of avoiding erroneous operation caused by clock skew by a simpler operation and less steps and decreasing the turnaround time (TAT) in the design of the layout.

2. Description of the Related Art

In semiconductor its, the signal propagation delay caused by interconnections is becoming greater in proportion to the overall signal propagation delay along with the increasing miniaturization in the fabrication process. Further, the signal propagation delay caused by the signal interconnections depends to a great extent on the results of the layout. As a result, the amount of the clock skew cannot be estimated precisely without knowing the result of the layout.

On the other hand, when clock skew occurred in a flip-flop of a semiconductor IC, erroneous operation caused by insufficient holding time sometimes occurs in a flip-flop supplied with the clock. For this reason, it is necessary to adjust for the clock skew by inserting delay elements into the logical net, that is, the path of the signal interconnections, for flip-flops with insufficient holding time based on the results of validation after the layout (simulation of logic taking into consideration timing information).

Below, an explanation will be made of an example of the erroneous operation caused by clock skew in a semiconductor IC. FIG. 1 is a circuit diagram of a shift register showing an example of cascade connected flip-flops controlled in timing by the same clock.

The shift register of the related art constitutes a first flip-flop F31 and a second flip-flop F32 of the same type. The first flip-flop F31 is controlled by a clock CK1, while the second flip-flop F32 is controlled synchronously by a clock CK2. Note that the clocks CK1 and CK2 are clocks of the same system (clocks in same clock tree in semiconductor IC). It is assumed that a signal propagation delay, that is, clock skew TSK, occurs between the clocks CK1 and CK2 due to the clock signal interconnections, clock buffers etc.

In the shift register of this related art, there is no combination logical gate circuit for delaying the signals on the signal line between the first flip-flop F31 and the second flip-flop F32, so this configuration is particularly susceptible to erroneous operation.

FIGS. 2A to 2D are waveform diagrams of signals in the flip-flops shown in FIG. 1. Input data changing from D1 to D2 to D3 etc. is supplied to the data input terminal D of the first flip-flop F31 from a data input terminal DT. The input data is set at the rising edge of the clock CK1. Accordingly, in the first flip-flop F31, the data D2 is held in the first cycle and the data D3 is held in the second cycle. As shown in FIG. 2B, the data held by the first flip-flop F31 is output from the data output terminal Q delayed from the rising edge of the clock CK1 by exactly a signal propagation delay TF31D of the first flip-flop F31.

The data output from the first flip-flop F31 is supplied as it is to a data input terminal D of the second flip-flop F32 and set at the rising edge of the clock CK2. From the viewpoint of the original function of a shift register, it is necessary that the second flip-flop F32 holds the data D1, held by the first flip-flop F31 in the previous cycle, in the first cycle and the data D2, held by the first flip-flop F31 in the first cycle, in the second cycle.

As shown in FIGS. 2A and 2C, however, a timing deviation occurs between the clocks CK1 and CK2 due to the clock skew TSK. Also, there is a signal propagation delay time TD12 caused by the signal interconnections from the data output terminal Q of the first flip-flop F31 to the data input terminal D of the second flip-flop F32. At the data input terminal D of the second flip-flop F32, a change of data, for example, a change from data D1 to D2 during the first cycle, becomes finalized after the elapse of the time of TF31D+TD12 from the rising edge of the clock CK1. Accordingly, at the rising edge of the clock CK2, the data at the data input terminal D of the second flip-flop F32 becomes the data held by the first flip-flop F31 during that cycle. This means that in the first cycle, the data D2 is held, while in the second cycle, the data D3 is held and that the first flip-flop F31 and the second flip-flop F32 hold the same data in the same cycle. The shift register is consequently unable to perform its original function and erroneous operation occurs.

Note that in this example of a shift register of the related art, erroneous operation may occur when the following condition is satisfied taking into account the setup time TF32S and the holding time TF32H of the second flip-flop:

$$TSK > TF31D + TD12 + TF32S - TF32H$$

Further, for reference, FIG. 3 is a circuit diagram of a logical cell of a flip-flop used when the shift register of this example of the related art is incorporated in a semiconductor IC. The first flip-flop F31 and the second flip-flop F32 are constituted as shown in FIG. 3 inside the semiconductor IC. In FIG. 3, the flip-flop is constituted by an inverter 308 receiving a clock CK and generating an internal clock CKN of negative logic, an inverter 309 receiving the internal clock CKN of negative logic and generating an internal clock CKP of positive logic, clocked inverters 301 and 304 controlled by the clock CKP of positive logic, clocked inverters 302 and 303 controlled by the clock CKN of negative logic, and inverters 305, 306, and 307.

As explained above, in designing a semiconductor IC, it is necessary to adjust for the clock skew according to the result of the validation after layout design by inserting delay elements into the logic net for the flip-flops with insufficient holding times. In the semiconductor IC and its design method of the related art, the area available in the layout has been decreasing along with the increase of the number of gates and interconnection layers in the semiconductor IC. This has made it extremely difficult to insert new delay elements. Furthermore, there was the disadvantage that the time for re-layout greatly increased and, as a result, the TAT of the layout design of a semiconductor IC has tremendously deteriorated.

Further, after re-layout, the insertion of delay elements or the change in disposition of the elements around the inserted delay elements sometimes caused a new possibility of erroneous operation such as holding time errors at other points. As a result, error sometimes could not be eliminated.

SUMMARY OF THE INVENTION

The present invention was made in consideration with the above circumstances and has as an object to provide a semiconductor IC and a design method thereof capable of avoiding erroneous operation caused by clock skew by a simpler operation and less steps and decreasing the turnaround time (TAT) in the design of the layout.

To achieve the above object, according to a first aspect of the present invention, there is provided a semiconductor IC comprising at least two stages of flip-flops for holding and outputting an input signal in response to a clock signal, an output signal of the front stage flip-flop being supplied to the rear stage flip-flop as the input signal of the rear stage, and a phase difference existing between the clock signals input to the front stage and the rear stage, and a delay element connected to the output side of the front stage flip-flop for delaying the front stage output signal by a delay time set in accordance with the phase difference of the front stage and rear stage clock signals and inputting the same to the rear stage flip-flop.

Preferably, the front stage flip-flop and the delay element are used as a single basic cell in the circuit design and the basic cell and rear stage flip-flop have the same or similar terminal positions and shapes.

Preferably, each of the flip-flops comprises a first latch circuit holding the input signal in response to the clock signal and a second latch circuit holding and outputting the data held by the first latch circuit in response to an inverted signal of the clock signal.

According to a second aspect of the present invention, there is provided a semiconductor IC comprising at least two stages of flip-flops for holding and outputting an input signal in response to a clock signal, an output signal of the front stage flip-flop being supplied to the rear stage flip-flop as the input signal of the rear stage, and a phase difference existing between the clock signals input to the front stage and the rear stage, and a delay element connected to the input side of the rear stage flip-flop for delaying the front stage output signal by a delay time set in accordance with the phase difference of the front stage and rear stage clock signals and inputting the same to the rear stage flip-flop.

Preferably, the delay element and the rear stage flip-flop are used as a single basic cell in the circuit design and the basic cell and front stage flip-flop have the same or similar terminal positions and shapes.

Preferably, each of the flip-flops comprises a first latch circuit holding the input signal in response to the clock signal and a second latch circuit holding and outputting the data held by the first latch circuit in response to an inverted signal of the clock signal.

According to a third aspect of the present invention, there is provided a method of design of a semiconductor IC, comprising a first step of providing, as selectable logical cells, a first logical cell comprising a flip-flop, a second logical cell comprising a flip-flop having the same characteristic as that of that flip-flop and a delay element connected to a signal input terminal of that flip-flop, and a third logical cell comprising a flip-flop having the same characteristic as that of that flip-flop and a delay element connected to a signal output terminal of that flip-flop; a second step of determining layout and interconnections in the semiconductor IC based on a given logical net without using the second and third logical cells and outputting layout information; a third step of performing logical simulation based on the layout information to obtain timing information; a fourth step of verifying the possibility of erroneous operation due to timing deviations by comparing the timing information with given design specifications; and a fifth step of determining layout and interconnections in the semiconductor IC by replacing a first logical cell with a second or third logical cell at a location determined to have a possibility of erroneous operation caused by timing deviations as a result of verification of the fourth step and outputting the layout information.

Preferably, the terminal positions and shapes of the first, second, and third logical cells are the same or similar.

Preferably, the fourth step determines there is a possibility of erroneous operation due to timing deviations for cascade-connected flip-flops controlled in timing by the same clock when the signal propagation delay for a clock signal path between any two first and second flip-flops connected in the cascade-connected flip-flops is greater than the sum of the signal propagation delay of the first flip-flop, the signal propagation delay of the signal path between the first flip-flop and the second flip-flop, and the difference between the setup time and the holding time of the second flip-flop and the fifth step substitutes the first logical cell having the first flip-flop by the third logical cell or substitutes the first logical cell having the second flip-flop by the second logical cell when it determines there is a possibility of erroneous operation caused by timing deviations as a result of the verification of the fourth step.

According to the semiconductor ICs and the method of design of the aspects of the present invention mentioned above, the layout of the semiconductor IC is first decided by making use of logical cells of ordinary flip-flops having no delay elements connected to their data input or output terminals based on the logical net generated by the circuit design. Then, logical simulation is performed based on the result of the layout, that is, layout information. By comparing the result of the logical simulation, that is, the timing information, with the design specifications of the semiconductor IC, the possibility of the erroneous operation caused by timing deviations is verified. The layout of the semiconductor IC is then finalized by replacing ordinary logical cells at the points where there is a possibility of :erroneous operation by logical cells having flip-flops and delay elements connected to their data input or output terminals.

In the semiconductor ICs and the method of design thereof of the above aspects of the present invention, the logical cells of the ordinary flop-flops having no delay elements at their data input or output terminals and the logical cells having flip-flops and delay elements connected to their data input or output terminals are provided as available logical cells, but the terminal positions and the shapes of these logical cells are made the same or similar, so the substitution in the re-layout can be performed simply without affecting the layout of the surrounding circuits and erroneous operation caused by clock skew after re-layout will not newly occur at other points. Accordingly, erroneous operation caused by clock skew can be suppressed by a simpler operation and less steps. The TAT of the layout of the semiconductor IC can be shortened as a result.

Furthermore, in the semiconductor ICs and method of design thereof according to the above aspects of the present invention, the possibility of erroneous operation can be verified from the result of logical simulation. That is, when the signal propagation delay time for a clock signal path between any two successive first and second flip-flops among cascade-connected flip-flops controlled in timing by the same clock is greater than the sum of the signal propagation delay time of the first flip-flop, the signal propagation delay time of the signal path between the first and second flip-flops, and the difference between the setup time and holding time of the second flip-flop, it is judged that there is a possibility of erroneous operation due to timing deviations. When there is a possibility of erroneous operation due to timing deviations, the first logical cell comprising the first flip-flop is replaced by the third logical cell comprising a flip-flop having a delay element connected to its data output terminal or the first logical cell comprising the second flip-flop is replaced by the second logical cell comprising a flip-flip having a delay element connected to its data input terminal.

In this way, since it is possible to insert delay elements into the logical net, when adjusting for clock skew according to the results of logical simulation after the layout design, by replacing the first logical cells with the second or third logical cells prepared in advance at locations where there is the possibility of erroneous operation due to timing deviations such as insufficient holding times, the re-layout work for eliminating erroneous operation due to clock skew becomes simple and more reliable and the TAT of the layout design of the semiconductor ICs can be shortened.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Figure 1:
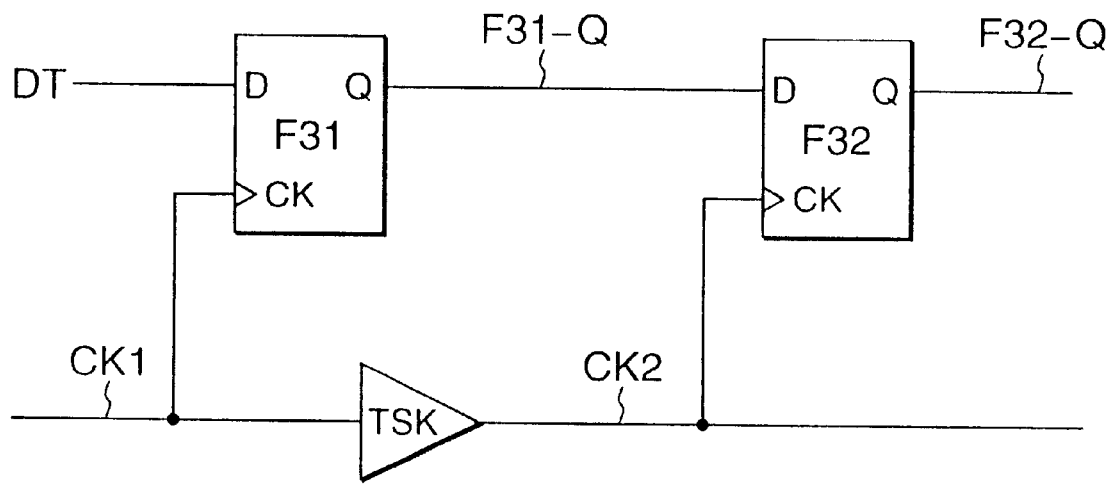
FIG. 1 is a circuit diagram of a shift register of the related art.

Below, preferred embodiments of the semiconductor IC and the method of design thereof of the present invention will be explained in detail by referring to the drawings.

First Embodiment

Figure 4:
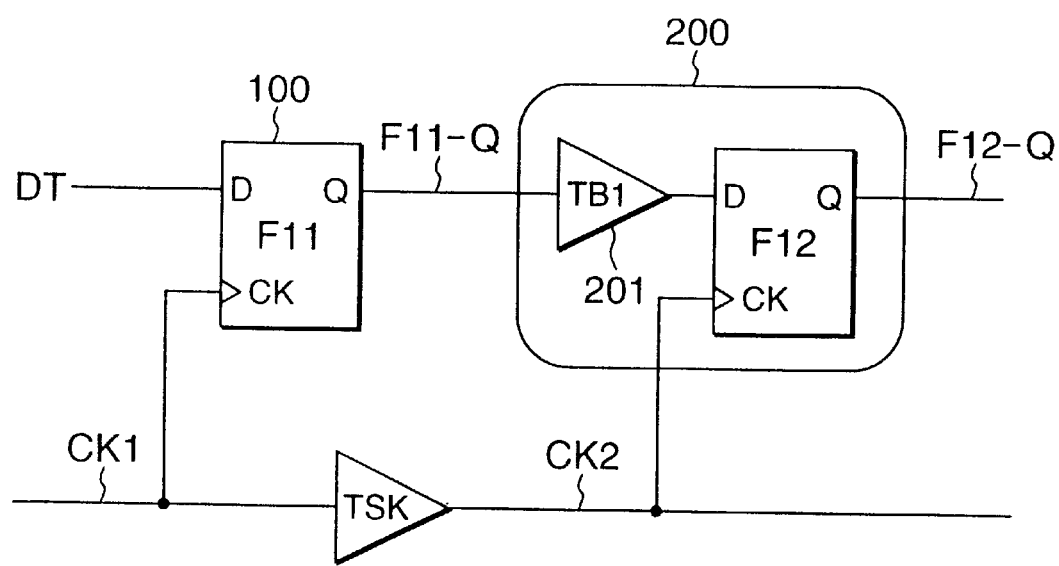
FIG. 4 is a circuit diagram of a semiconductor IC according to a first embodiment of the present invention.

FIG. 4 is a circuit diagram of a semiconductor IC according to a first embodiment of the present invention showing a shift register constituted by flip-flops.

As illustrated, the shift register of the present embodiment further comprises a delay element 201 connected to the data input side of a rear stage flip-flop F12 as compared with the shift register of the related art shown in FIG. 1. The output signal F11-Q of the front stage flip-flop F11 is delayed by the delay element 201, then input to the rear stage flip-flop F12.

In FIG. 4, the shift register is constituted by the first flip-flop F11 and the second flip-flop F12 of the same type and the delay element 201. The first flip-flop F11 is controlled by a clock CK1, while the second flip-flop F12 is controlled synchronously by a clock CK2. Note that the first flip-flop F11 is used as a first logical cell 100, and the second flip-flop F12 and the delay element 201 are used as a second logical cell 200 in circuit design. Further, the clocks CK1 and CK2 are clocks of the same system. There is a clock skew TSK between the clock CK1 and CK2 caused by, for example, the interconnections of the circuit.

In the present embodiment, the first logical cell 100 and the second logical cell 200 have the same or similar terminal positions and shapes.

FIGS. 5A to 5D are waveform diagram of signals of the shift register shown in FIG. 4. Below, the operation of the first embodiment will be explained by referring to FIGS. 5A to 5D.

Figure 5:
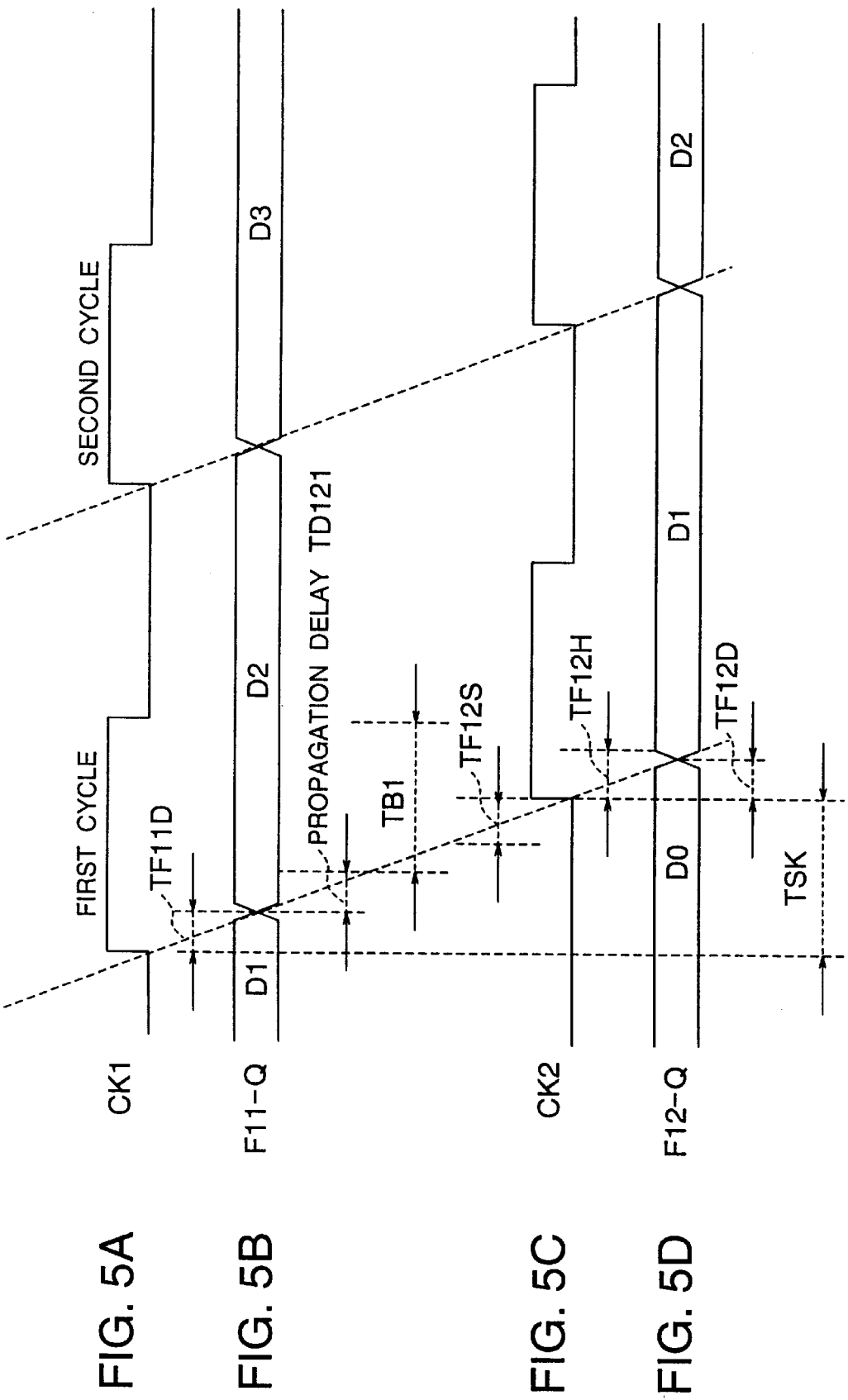
FIGS. 5A to 5D are waveform diagrams of the first embodiment.

Input data changing from D0, D1, D2 to D3 . . . is input to a data input terminal DT and set in the first flip-flop F11 at the rising edge of the clock CK1. Accordingly, the first flip-flop F11 holds the data D2 during a first cycle and holds the data D3 during a second cycle. The data held in the first flip-flop F11 is output to a data output terminal Q after a signal propagation delay time TF11D of the first flip-flop F11 from the rising edge of the clock CK1 as shown in FIG. 5B. The output of the first flip-flop F11 is supplied to the data input terminal D of the second flip-flop F12 through the delay element 201 having a delay time of TB1 and set into the second flip-flop F12 at the rising edge of the clock CK2. Accordingly, in the data input terminal D of the second flip-flop F12, the data change of the output data of the first flip-flop F11, for example, the data change from D1 to D2 during the first cycle, is finalized after a delay time of the sum of the signal propagation delay time TF11D of the first flip-flop F11, the signal propagation delay time TD121 of the signal interconnections between the output terminal Q of the first flip-flop F11 and the input terminal of the delay element 201, and the delay time TB1 of the delay element 201 from the rising edge of the clock CK1.

On the other hand, as shown in FIG. 5A and FIG. 5C, even if the clock skew TSK occurs between the clock CK1 and the clock CK2, because the relation $$TSK<TF11D+TD121+TB1$$

is satisfied, the clock CK2 rises before the final determination of the output data of the first flip-flop F11. As a result, at the rising edge of the clock CK2, the second flip-flop F12 holds the data D1, held by the first flip-flop F11 in the previous cycle, in the first cycle and holds the data D2, held by the first flip-flop F11 in the first cycle, in the second cycle.

As explained above, in the shift register of the present embodiment, since the output data F11-Q of the front stage flip-flop F11 is input to the rear stage flip-flop F12 after being delayed by the delay element 201, by setting the delay time TB1 of the delay element 201 in accordance with the clock skew between the clocks CK1 and CK2, the original function of the flip-flop can be performed and erroneous operation caused by clock skew can be avoided.

Figure 6:
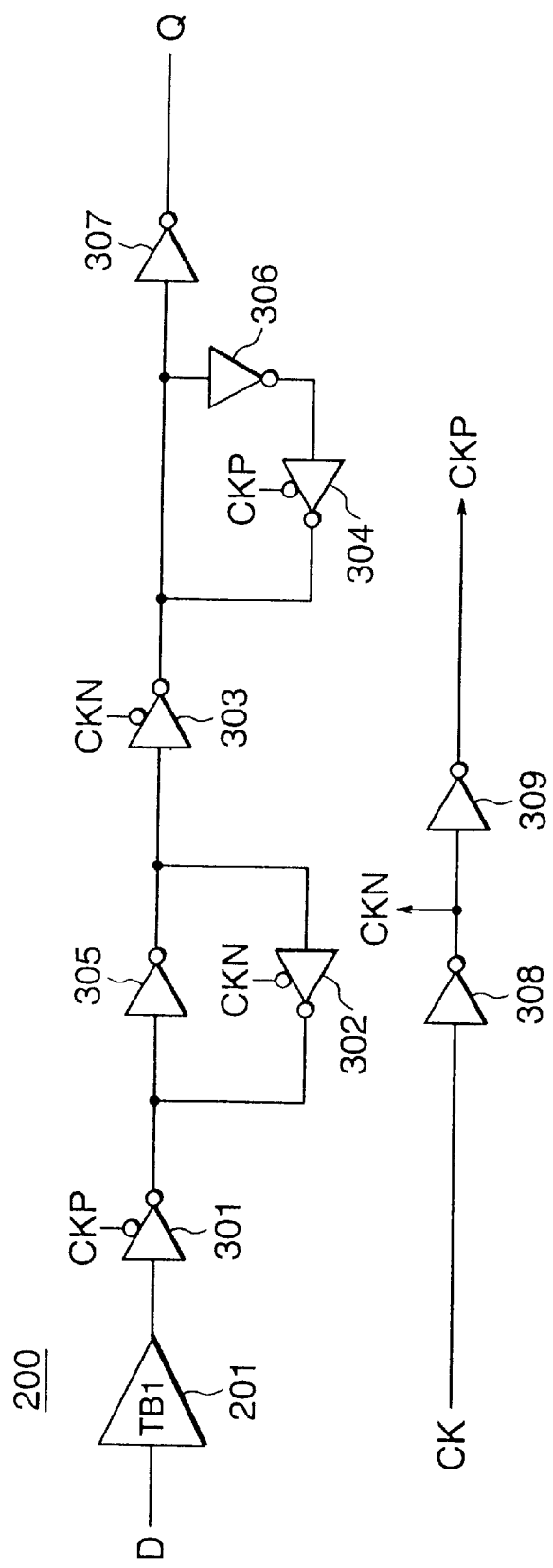
FIG. 6 is a circuit diagram of a flip-flop and a delay element connected to the data input thereof.

FIG. 6 shows the circuit configuration of the second logical cell 200 of the present embodiment constituted by the flip-flop F12 and the delay element 201 for reference. Note that the first logical cell 100 constituted by the flip-flop F11 has the same configuration as that of the, flip-flop of the related art shown in FIG. 3, so the explanation of the configuration and operation of the same is omitted.

As illustrated in FIG. 6, the second logical cell 200 is constituted by a delay element 201 for delaying the input data by a predetermined delay time TB1, an inverter 308 receiving a clock CK and generating an internal clock CKN of negative logic, an inverter 309 receiving the internal clock CKN and generating an internal clock CKP of positive logic, clocked inverters 301 and 304 controlled by the clock CKP of positive logic, clocked inverters 302 and 303 controlled by the clock CKN of negative logic, and inverters 305, 306, and 307.

When the clock CK is at a low level, the clock CKP is held at the low level and the clocked inverter 301 inverts and outputs the input data. When the clock CK is at a high level, the clock CKP is also held at the high level and the output terminal of the clocked inverter 301 is set in a high-impedance state. The clocked inverter 304 controlled by the same clock CKP operates similarly to the clocked inverter 301.

On the other hand, since the clocked inverters 302 and 303 are controlled by an inverted clock CKN of the clock CK, when the clock CK is at the high level, they invert the input data for output, while when the clock CK is at the low level, the output terminals thereof are held in the high-impedance state. The data input to the data input terminal D is delayed by the delay element 201 by the delay time TB1 then input to the clocked inverter 301. When the clock CK is at the low level, data having the same logical level with that input to the input terminal D is supplied to the input terminal of the clocked inverter 303. At the time when the clock CK is switched from the low level to the high level, the input data is held in the state immediately before by a latch circuit formed by the clocked inverter 305 and the inverter 302. Further, the held data is output to the output terminal Q of the flip-flop through the clocked inverter 303 and the inverter 307. At the time when the clock CK switches again to the low level, the data is held in the state immediately before by a latch formed by the clocked inverter 304 and the inverter 306. Therefore, the data at the output terminal Q of the flip-flop is held during the period when the clock CK is at the low level.

In this way, by the second logical cell 200 of the present embodiment, the input data delayed by the delay element 201 is sampled by the flip-flop at the rising edge of the clock CK then output to the output terminal Q. The output data at the output terminal Q is held until the next rising edge of the clock CK.

As explained above, according to the semiconductor IC of the present embodiment, there is provided a shift register comprising the first logical cell 100 and the second logical cell 200. The second logical cell 200 comprises the flip-flop F12 having the same characteristics with that of the flip-flop F11 forming the first logical cell 100 and the delay element 201. Since the delay time TB1 of the delay element 201 is set in accordance with the clock skew between the clocks CK1 and CK2 input to the flip-flops F11 and F12, erroneous operation due to the clock skew can be avoided.

Second Embodiment

Figure 7:
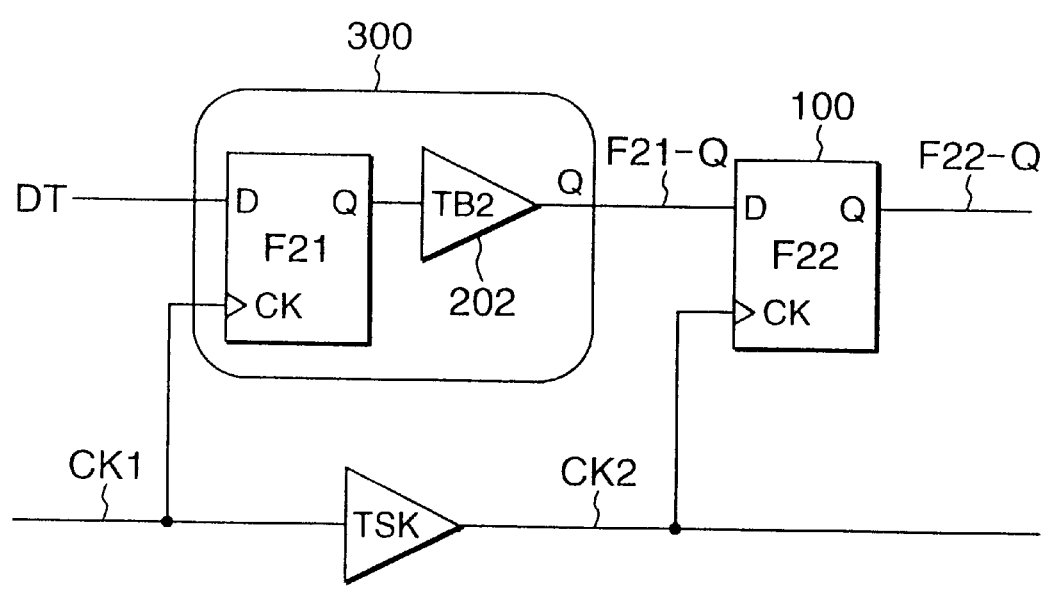
FIG. 7 is a circuit diagram of a semiconductor IC according to a second embodiment of the present invention.

FIG. 7 is a circuit diagram of a semiconductor IC according to a second embodiment of the present invention and shows another shift register constituted by flip-flops.

As illustrated, the shift register of the present embodiment further comprises a delay element 202 connected to the data output side of the front stage flip-flop F21 as compared to the shift register of the related art shown in FIG. 1. The output signal of the front stage flip-flop F21 is delayed by the delay element 202, then input to the rear stage flip-flop as the output signal F21-Q of the front stage flip-flop.

In FIG. 7, the shift register is constituted by the first flip-flop F21 and the second flip-flop F22 of the same type and the delay element 202. The first flip-flop F21 is controlled by a clock CK1, while the second flip-flop F22 is controlled synchronously by a clock CK2. Note that the second flip-flop F22 is used as a first logical cell 100, and the first flip-flop F21 and the delay element 202 are used as a third logical cell 300 in the circuit design. Further, the clocks CK1 and CK2 are of the same system. There is a clock skew TSK between the clock CK1 and CK2 caused by, for example, interconnections of the circuit. In the present embodiment, the first logical cell 100 and the third logical cell 300 have the same or similar terminal positions and shapes.

FIGS. 8A to 8D are waveform diagram of signals of the shift register shown in FIG. 7. Below, the operation of the second embodiment will be explained by referring to FIGS. 8A to 8D.

Figure 8:
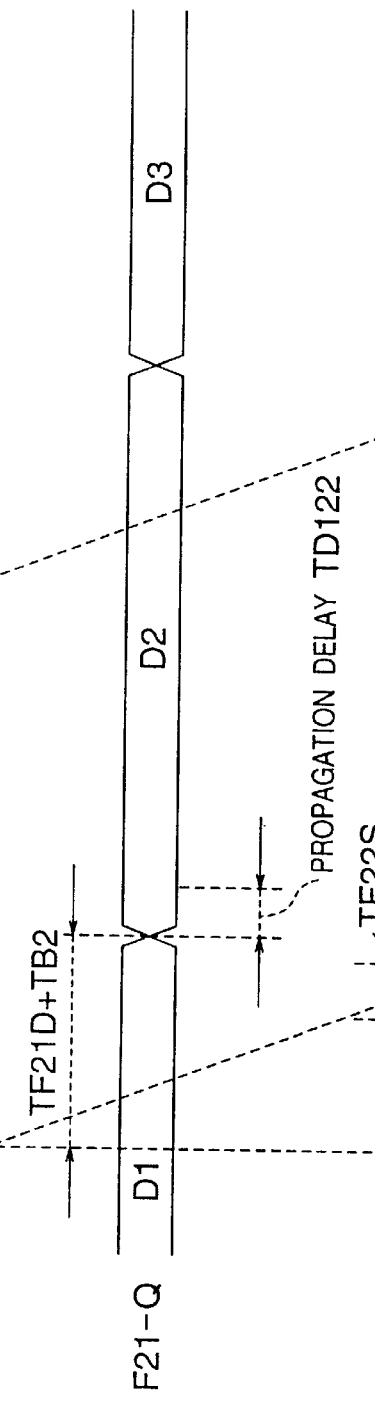
FIGS. 8A to 8D are waveform diagrams of the second embodiment.

Input data changing from D0, D1, D2 to D3 . . . is input to a data input terminal DT and set into the first flip-flop F21 at the rising edge of the clock CK1. Accordingly, the first flip-flop F21 holds the data D2 during a first cycle and holds the data D3 during a second cycle. The data held in the first flip-flop F21 is output to a data output terminal Q after being delayed by a delay time of the sum of a signal propagation delay time TF21D of the first flip-flop F21 and a delay time TB2 of the delay element 202 from the rising edge of the clock CK1 as shown in FIG. 8B. The output data F21-Q of the first stage is supplied to the data input terminal D of the second flip-flop F22 and set into the second flip-flop F22 at the rising edge of the clock CK2. Accordingly, at the data input terminal of the second flip-flop F22, the data change of the output data of the first flip-flop F21, for example, the data change from D1 to D2 during the first cycle, is finalized after a delay time of the sum of the signal propagation delay time TF21D of the first flip-flop F21, the delay time TB2 of the delay element 202, and the signal propagation delay time TD122 of the signal interconnection between the output terminal of the delay element 202 and the input terminal D of the second flip-flop F22 from the rising edge of the clock CK1.

On the other hand, as shown in FIG. 8A and FIG. 8C, even if the clock skew TSK occurs between the clock CR1 and the clock CK2, since the relation

TSK<TF21D+TB2+TD122 is satisfied, the clock CR2 rises before the final determination of the data at the data input terminal D of the second flip-flop F22, that is, the output data of the first flip-flop F21. As a result, at the rising edge of the clock CR2, the second flip-flop F22 holds the data D1, held by the first flip-flop F21 in the previous cycle, during the first cycle and holds the data D2, held by the first flip-flop F21 in the first cycle, during the second cycle.

As explained above, in the shift register of the resent embodiment, since the output data of the front stage flip-flop F21 is input as the data F21-Q to the rear stage flip-flop F22 after being delayed by the delay element 202, by setting the delay time TB2 of the delay element 202 in accordance with the clock skew between the clocks CK1 and CK2, the original function of the flip-flop can be performed and erroneous operation caused by clock skew can be avoided.

Figure 9:
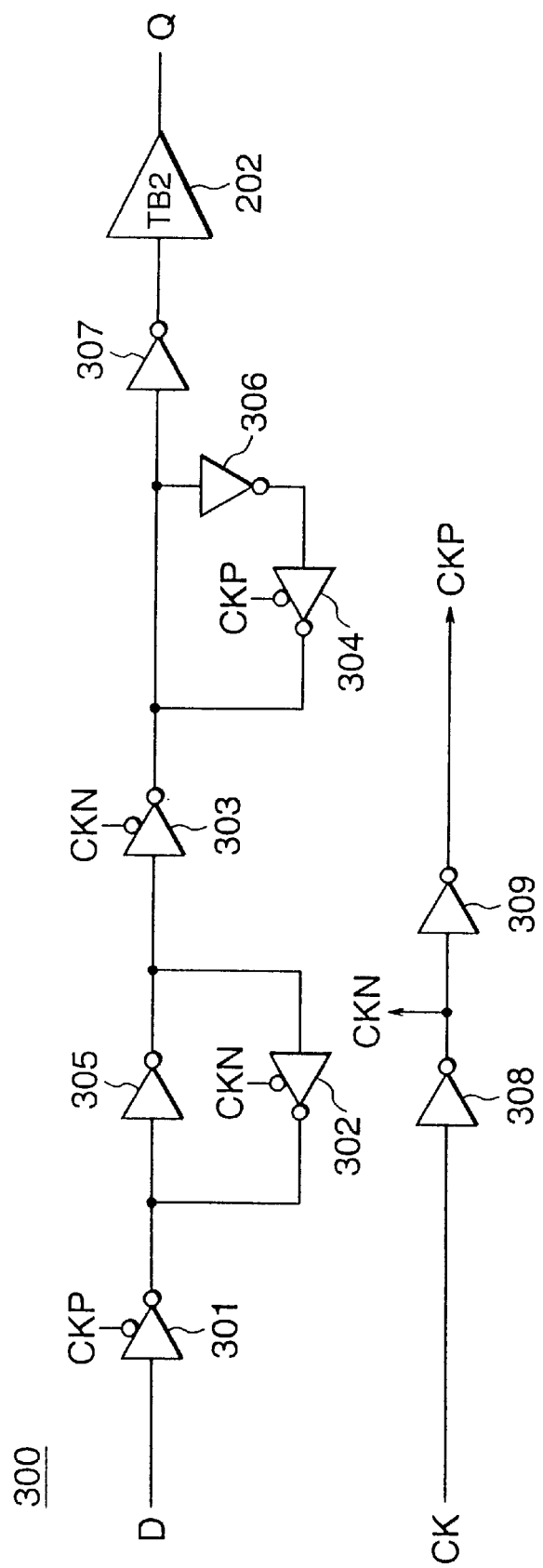
FIG. 9 is a circuit diagram of a flip-flop and a delay element connect to the data output thereof.

FIG. 9 shows the circuit configuration of the third logical cell 300 of the present embodiment constituted by the flip-flop F21 and the delay element 202 for reference. Note that since the first logical cell 100 constituted by the flip-flop F22 has the same configuration as that of the flip-flop of the related art shown in FIG. 3, the explanation of the configuration and operation thereof is omitted.

As illustrated in FIG. 9, the third logical cell 300 is constituted by an inverter 308 receiving a clock CK and generating an internal clock CKN of negative logic, an inverter 309 receiving the internal clock CKN and generating a internal clock CKP of positive logic, clocked inverters 301 and 304 controlled by the clock CKP of positive logic, clocked inverters 302 and 303 controlled by the clock CKN of negative logic, inverters 305, 306, and 307, and a delay element 202 for delaying the input data by a predetermined delay time TB2.

When the clock CK is at a low level, the clock CKP is held at the low level and the clocked inverter 301 inverts and outputs the input data. When the clock CK is at a high level, the clock CKP is also held at the high level and the output terminal of the clocked inverter 301 is set in a high-impedance state. The clocked inverter 304 controlled by the same clock CKP operates similarly with the clocked inverter 301.

On the other hand, since the clocked inverters 302 and 303 are controlled by an inverted clock CKN of the clock CK, when the clock CK is at the high level, they invert and output the input data, while when the clock CK is at the low level, the output terminals thereof are held in the high-impedance state. The data input to the data input terminal D is input to the clocked inverter 301. When the clock CK is at the low level, data having the same logical level with that input to the input terminal D is supplied to the input terminal of the clocked inverter 303. At the time when the clock CK is switched from the low level to the high level, the input data is held in the state immediately before by a latch circuit formed by the clocked inverter 305 and the inverter 302. Further, the held data is output to the output terminal Q of the flip-flop through the clocked Inverter 303 and the inverter 307 and delayed by the delay element 202 by the delay time TB2. At the time when the clock CK switches again to the low level, the data is held in the state immediately before by a latch formed by the clocked inverter 304 and the inverter 306. Therefore, the data at the output terminal of the flip-flop is held during the period when the clock CK is at the low level, then changes according to the next input data after a delay time TB2 from the rising edge of the clock CK.

In this way, by the third logical cell 300 of the present embodiment, the input data is sampled by the flip-flop at the rising edge of the clock CK, then output to the output terminal Q after being delayed by the delay element 202 by the delay time TB2. The output data at the output terminal Q is held until the time delayed by exactly TB2 from the next rising edge of the clock CK.

As explained above, according to the semiconductor IC of the present embodiment, there is provided a shift register comprising the third logical cell 300 and the first logical cell 100 and the third logical cell 300 comprises the flip-flop F21 having the same characteristics with that of the flip-flop F22 forming the first logical cell 100 and the delay element 202. Since the delay time TB2 of the delay element 202 is set in accordance with the clock skew between the clocks CK1 and CK2 input to the flip-flops F21 and F22, erroneous operation due to clock skew can be avoided.

Third Embodiment

Figure 10:
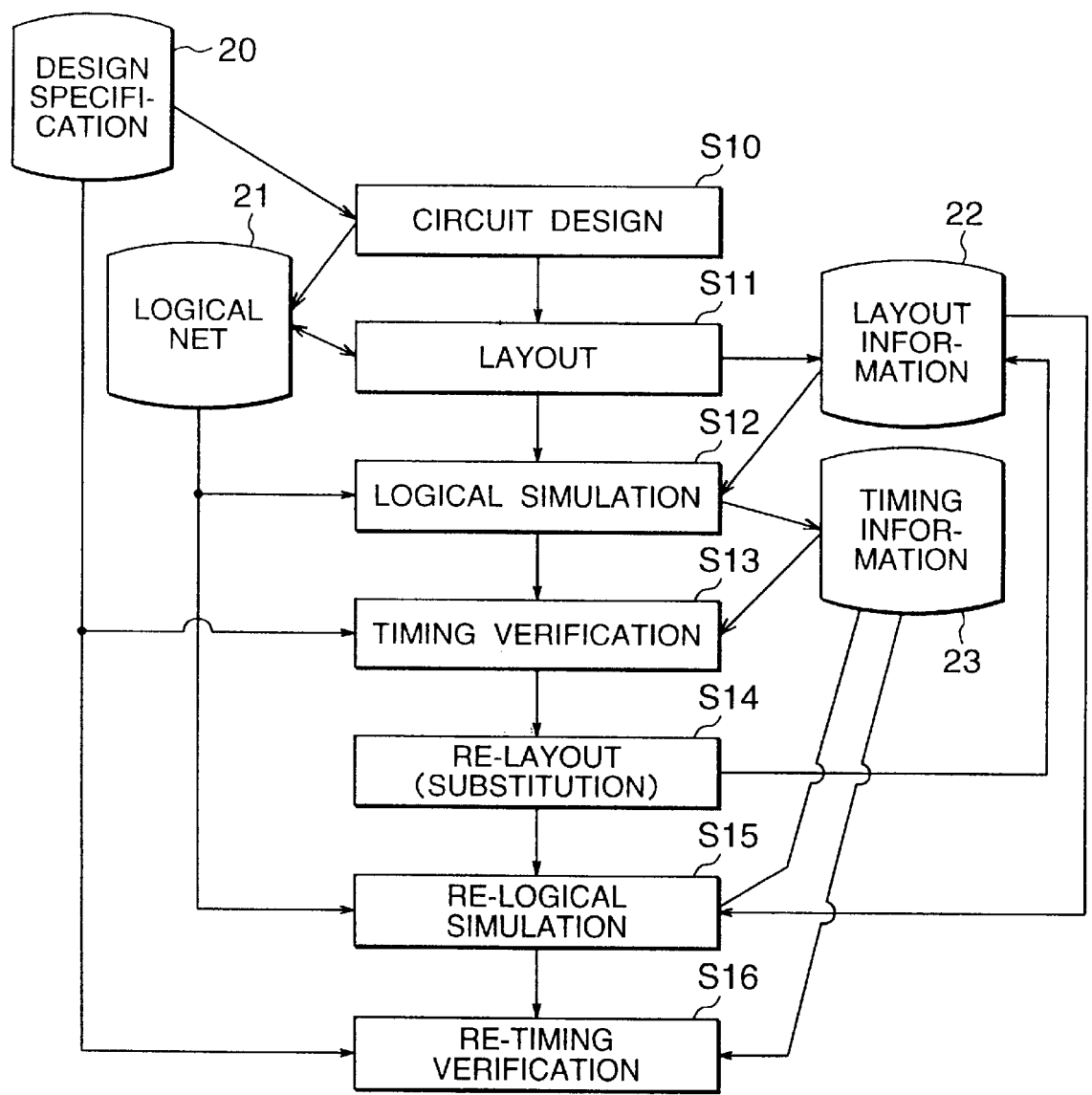
FIG. 10 is a diagram of a design aid device for designing semiconductor ICs according to the first and the second embodiments of the present invention and explains the method of design of the semiconductor ICs of the first and the second embodiments.

FIG. 10 is a diagram of a design aid device for designing a semiconductor IC according to the present invention and explains the principle of the method of design of the semiconductor IC.

Below, the method of design of a semiconductor IC according to the present invention will be explained by referring to FIG. 10.

In FIG. 10, first, as shown in step 10, a semiconductor IC is designed to satisfy the design specifications 20. A logic net 21 is obtained from the result of the circuit design. In the layout design, the layout is decided based on the logic net 21 obtained by the circuit design by referring to a logic cell library, not illustrated. To solve the problem of erroneous operation caused by clock skew resulting from the layout design, after the first layout design (step 11), logic simulation (step 12) and timing verification (step 13) are conducted. The possibility of erroneous operation caused by timing deviations is thereby verified. Re-layout(step 14) is performed by substitution of logical cells for each point where erroneous operation is liable to occur.

Various logic cells available for the semiconductor IC to be designed are registered in the logic cell library. In the design aid device for designing the semiconductor IC in the present embodiment, there is a characteristic that at least three kinds of logical cells are available for selection, that is the first logical cell comprising a flip-flop, the second logical cell comprising a flip-flop having the same characteristic as that of the flip-flop of the first logical cell and a delay element connected to the data input thereof, and the third logical cell comprising a flip-flop having the same characteristic as that of the flip-flop of the first logical cell and a delay element connected to the data output thereof. Note that the first, second, and third logical cells have the same or similar terminal positions and shapes.

Figure 3:
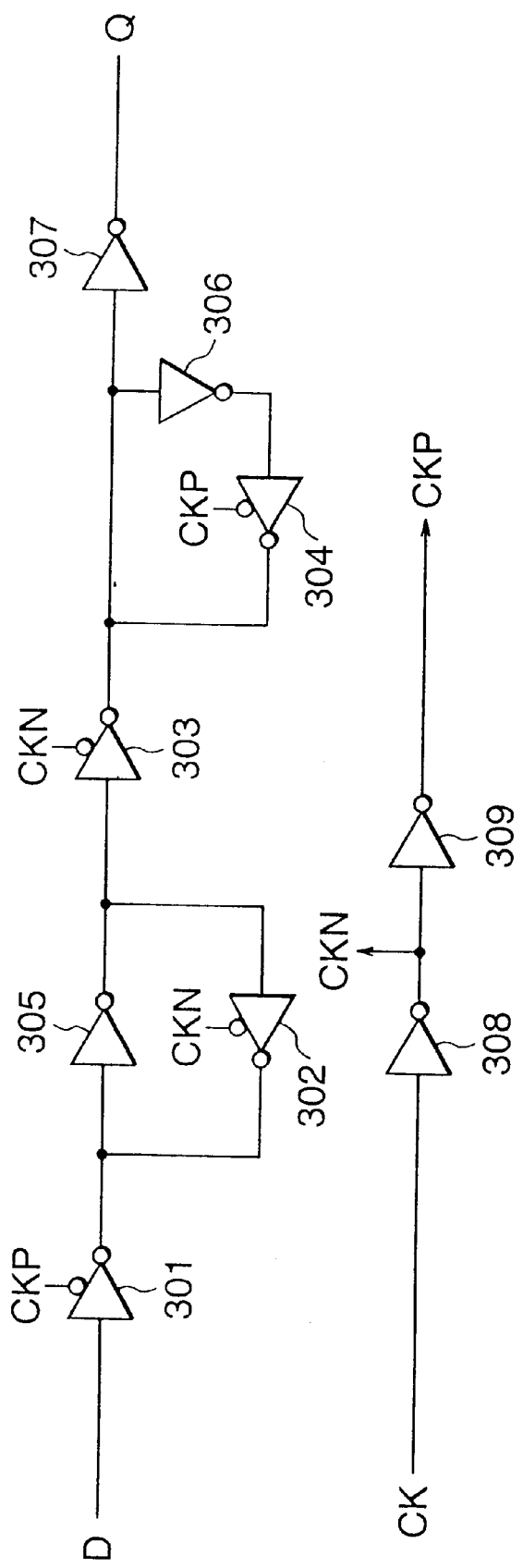
FIG. 3 is a circuit diagram of a logical cell of a flip-flop used in the shift register of the related art incorporated in a semiconductor IC.

The configuration of the first logic cell is the same as that of the related art as shown in FIG. 3. The configurations of the second and third logical cells are as explained in detail in the first and second embodiments, respectively.

Regarding the layout design, first the layout of step S11 is performed. That is, the layout is decided by referring to the logical cell library (not illustrated) based on the result of circuit design of step 10, that is, the logic net 21, then the layout information 22 is output. Note that the layout and interconnection of the semiconductor IC are decided using only first logical cell in the layout of step S11. The logic simulation of step S12 is performed based on the logic net 21 and the layout information 23 to give the timing information. The timing verification of step S13 verifies the possibility of erroneous operation caused by timing deviations by comparing the design specifications with the timing information 23.

Figure 2:
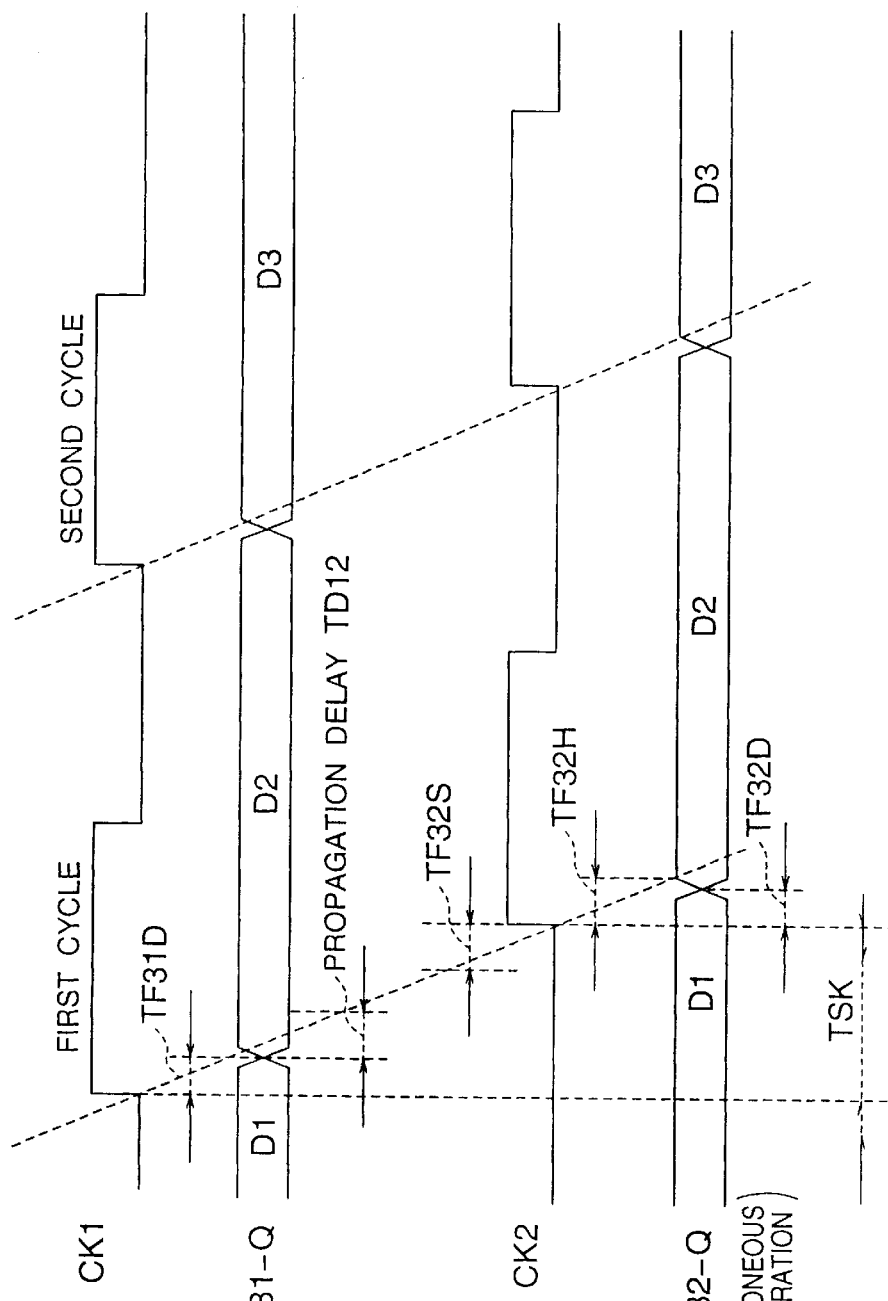
FIGS. 2A to 2D are waveform diagrams of signals of the shift register of the related art.

Here, the judgement by the timing verification of step S13 is explained in detail. For example, referring to the erroneous operation due to insufficient holding time occurring along with clock skew in cascade-connected flip-flops controlled in timing by the same clock, that is, a shift register, which was taken up in the explanation of the related art shown in FIG. 1 and FIG. 2, it is judged that there is a possibility of erroneous operation due to timing deviations when the signal propagation delay time (clock skew) TSK of a clock signal path between any two successive first and second flip-flops F31 and F32 among the cascade-connected flip-flops is greater than the sum of the signal propagation delay time TF31D of the first flip-flop F31, the signal propagation delay time TD12 of the signal path between the first flip-flop F31 and the second flip-flop F32, and the difference between the setup time TF32S and holding time TF32H of the second flip-flop F32.

In the re-layout of step S14, the first logical cells at the points judged to have the possibility of erroneous operation caused by timing deviations are replaced by the second or third logical cells. The layout and interconnections of the semiconductor IC are then decided and the layout information 22 is output.

For example, the position in the shift register shown in FIG. 1 in the semiconductor IC is judged to have the possibility of erroneous operation due to timing deviations when the condition of

TSK>TF31D+TD12+TF32S−TF32H is satisfied. The first logic cell containing the second flip-flop F32 is replaced by the second logical cell, or the first logical cell containing the first flip-flop F31 is replaced by the third logical cell.

The configurations of the shift registers obtained by the substitution of the logical cells as contrasted with the shift register shown in FIG. 1 are shown in FIG. 4 and FIG. 7. After the substitutions of the logical cells, re-logical simulation is performed as step S15. In the re-logical simulation of step S15, the timing information 23 is obtained based on the result of the re-layout of step S14, that is, the layout information 22, and the logical net 21. In the re-timing verification of step 16, the possibility of the occurrence of the erroneous operation caused by timing deviations is verified again by comparing the timing information 23 and the design specifications.

When the result of the re-verification is that erroneous operation is avoided, the semiconductor IC design is considered to satisfy the design specifications and to operate normally. The circuit design is then considered finished. Furthermore, when the result of the re-verification is that there is a possibility of erroneous operation caused by timing deviations, the operations from step S14 to step S16 are repeated.

As explained above, according to the design aid device for designing a semiconductor IC and the method of design of the present embodiment, the clock skew at the points having the possibility of erroneous operation caused by timing deviations, such as insufficient holding time, is adjusted for by substitution by the second and third logical cells prepared in advance based on the result of the logical simulation after layout. Therefore, the re-layout for suppressing erroneous operation caused by clock skew can be reliably performed by a simple operation and the TAT of the layout design of the semiconductor IC can be shortened.

Further, according to the design aid device for designing a semiconductor IC and the method of design of the present embodiment, there are provided three kinds of logical cells available, that is, the first logical cell comprising an ordinary flip-flop, the second logical cell comprising a flip-flop with a delay element connected to the data input thereof, and the third logical cell comprising a flip-flop with a delay element connected to the data output thereof. Since the terminal positions and the shapes of these logical cells are the same or similar, the re-layout can be performed simply without affecting the surrounding circuits and occurrence of new erroneous operation at other places caused by clock skew after re-layout can be avoided. No repetition of re-layout is necessary, and erroneous operations caused by clock skew can be suppressed by a simpler operation and less steps. As a result, the TAT of layout design of the semiconductor IC can be shortened.

As explained above, according to the semiconductor ICs and the method of design of the same of the present invention, erroneous operation caused by clock skew can be suppressed by simpler operation and less steps and the TAT of the layout design of the semiconductor IC can be shortened.

While the invention has been described with reference to specific embodiments chosen for purposes of illustration, it should be apparent that numerous modifications could be made thereto by those skilled in the art without departing from the basic concept and scope of the invention.

What is claimed is:

1. A method of design of a semiconductor IC comprising:

a first step of providing, as selectable logical cells, a first logical cell comprising a flip-flop, a second logical cell comprising a flip-flop having the same characteristic as that of the flip-flop of the first logical cell and a delay element connected to a signal input terminal of that flip-flop, and a third logical cell comprising a flip-flop having the same characteristic as that of the flip-flop of the first logical cell and a delay element connected to a signal output terminal of that flip-flop, a second step of determining layout and interconnections in the semiconductor IC based on a given logical net without using the second and third logical cells and outputting layout information, a third step of performing logical simulation based on the layout information to obtain timing information, a fourth step of verifying the possibility of erroneous operation due to timing deviations by comparing the timing information with given design specifications, and a fifth step of determining layout and interconnections in the semiconductor IC by replacing a first logical cell with a second or third logical cell at a location determined to have a possibility of erroneous operation caused by timing deviations as a result of verification of the fourth step and outputting the layout information, wherein the fourth step determines there is a possibility of erroneous operation due to timing deviations for cascade-connected flip-flops controlled in timing by the same clock when the signal propagation delay for a clock signal path between any two first and second flip-flops connected in the cascade-connected flip-flops is greater than the sum of the signal propagation delay of the first flip-flop, the signal propagation delay of the signal path between the first flip-flop and the second flip-flop, and the difference between the setup time and the holding time of the second flip-flop, and wherein the fifth step replaces the first logical cell having the first flip-flop by the third logical cell or replaces the first logical cell having the second flip-flop by the second logical cell when it determines there is a possibility of erroneous operation caused by timing deviations as a result of the verification of the fourth step.

* * * * *